(12) United States Patent
Dorresteijn

(10) Patent No.: US 11,159,522 B2
(45) Date of Patent: Oct. 26, 2021

(54) METHOD FOR AUTHENTICATION, SERVER, DEVICE AND DATA CARRIER

(71) Applicant: Baseline Automatisering B.V., Amsterdam (NL)

(72) Inventor: Johannes Jacobus Marie Dorresteijn, Amsterdam (NL)

(73) Assignee: Baseline Automatisering B.V., Amsterdam (NL)

( * ) Notice: Subject to any disclaimer, the term of this patent is extended or adjusted under 35 U.S.C. 154(b) by 0 days.

(21) Appl. No.: 14/787,937

(22) PCT Filed: Apr. 29, 2014

(86) PCT No.: PCT/NL2014/050278
§ 371 (c)(1),
(2) Date: Oct. 29, 2015

(87) PCT Pub. No.: WO2014/196852
PCT Pub. Date: Dec. 11, 2014

(65) Prior Publication Data
US 2016/0087981 A1    Mar. 24, 2016

(30) Foreign Application Priority Data

Apr. 29, 2013 (NL) ..................................... 2010733

(51) Int. Cl.
*G06F 21/34* (2013.01)
*H04L 29/06* (2006.01)
(Continued)

(52) U.S. Cl.
CPC ........ *H04L 63/0876* (2013.01); *G06F 21/313* (2013.01); *G06F 21/34* (2013.01);
(Continued)

(58) Field of Classification Search
CPC ........ G06F 21/34; G06F 21/43; G06F 21/313; H04L 63/0853; H04L 63/0876; H04L 63/083
(Continued)

(56) References Cited

U.S. PATENT DOCUMENTS 8,365,258 B2    1/2013  Dispensa
8,955,076 B1 *  2/2015  Faibish .................. H04L 63/08
                                                    726/7
(Continued)

FOREIGN PATENT DOCUMENTS

WO    2012004640 A1    1/2012

*Primary Examiner* — David J Pearson
(74) *Attorney, Agent, or Firm* — The Webb Law Firm

(57) ABSTRACT

A method for authentication between a server process and a client process by means of multiple communication including a primary authentication communication and a secondary authentication communication. The method includes steps for: the server process receiving from the client process an initiating communication of the primary authentication communication, the server process initiating the secondary authentication communication between the server process and a client authentication process, the server process receiving primary authentication information comprising an authentication code or an authentication result, the server process receiving secondary authentication information comprising an authentication code or an authentication result of the secondary authentication communication, and the server process establishing the authentication on the basis of the primary and secondary authentication information.

20 Claims, 5 Drawing Sheets

(51) Int. Cl.
*G06F 21/43* (2013.01)
*G06F 21/35* (2013.01)
*G06F 21/31* (2013.01)

(52) U.S. Cl.
CPC .............. *G06F 21/35* (2013.01); *G06F 21/43* (2013.01); *H04L 63/08* (2013.01); *H04L 63/083* (2013.01); *H04L 63/0853* (2013.01); *H04L 63/18* (2013.01)

(58) Field of Classification Search
USPC .................................................... 726/3, 5, 7
See application file for complete search history.

(56) References Cited

U.S. PATENT DOCUMENTS

| | | | |
|---|---|---|---|
| 9,571,282 B1* | 2/2017 | Aggarwal | H04L 63/0853 |
| 2008/0098225 A1 | 4/2008 | Baysinger | |
| 2008/0120711 A1* | 5/2008 | Dispensa | H04L 63/0869 |
| | | | 726/7 |
| 2009/0158410 A1* | 6/2009 | Yasuda | H04L 63/101 |
| | | | 726/7 |
| 2010/0100725 A1* | 4/2010 | Ozzie | G06F 21/43 |
| | | | 713/155 |
| 2010/0100945 A1* | 4/2010 | Ozzie | G06F 21/35 |
| | | | 726/5 |
| 2011/0086616 A1* | 4/2011 | Brand | G06Q 20/425 |
| | | | 455/411 |
| 2011/0185406 A1* | 7/2011 | Hirson | G06Q 20/32 |
| | | | 726/6 |
| 2011/0213711 A1* | 9/2011 | Skinner | G06F 21/43 |
| | | | 705/71 |
| 2011/0219230 A1* | 9/2011 | Oberheide | H04W 12/08 |
| | | | 713/168 |
| 2013/0091559 A1* | 4/2013 | Thun | G06F 21/43 |
| | | | 726/9 |
| 2013/0263211 A1* | 10/2013 | Neuman | H04L 9/3247 |
| | | | 726/1 |
| 2013/0297513 A1* | 11/2013 | Kirillin | G06Q 40/02 |
| | | | 705/67 |
| 2013/0312073 A1* | 11/2013 | Srivastav | H04W 12/068 |
| | | | 726/7 |
| 2014/0007205 A1* | 1/2014 | Oikonomou | G06F 21/35 |
| | | | 726/6 |
| 2014/0020073 A1* | 1/2014 | Ronda | G06F 21/31 |
| | | | 726/7 |
| 2014/0189808 A1* | 7/2014 | Mahaffey | H04L 63/083 |
| | | | 726/4 |
| 2014/0223525 A1* | 8/2014 | Fadida | H04L 63/083 |
| | | | 726/6 |
| 2014/0237236 A1* | 8/2014 | Kalinichenko | H04L 63/0853 |
| | | | 713/168 |
| 2014/0282964 A1* | 9/2014 | Stubblefield | H04L 63/0853 |
| | | | 726/7 |

\* cited by examiner

METHOD FOR AUTHENTICATION, SERVER, DEVICE AND DATA CARRIER

CROSS-REFERENCE TO RELATED APPLICATIONS

This application is the United States national phase of International Application No. PCT/NL2014/050278 filed Apr. 29, 2014, and claims priority to Dutch Patent Application No. 2010733 filed Apr. 29, 2013, the disclosures of which are hereby incorporated in their entirety by reference.

BACKGROUND OF THE INVENTION

Field of the Invention

The present invention relates to a method for authentication between a server process and a client process by means of multiple communication comprising at least a primary authentication communication and a secondary authentication communication. The present invention also relates to a method for a client authentication process. The present invention further relates to a machine-readable medium comprising instructions for performing a server process or a client authentication process according to the present invention. The present invention also relates to a server for performing a server process according to the present invention. The present invention further relates to a device for performing a client authentication process according to the present invention.

Description of Related Art

Authentication of users of distributed computer systems is a controversial issue in the sense that unauthorized access to data, applications and systems has to be prevented while convenience of use of the distributed systems is also important.

Different types of authentication have therefore been developed wherein authentication based on username and password is the most common. When such an authentication on the basis of username and password is not sufficient, use is for instance made of a further authentication wherein the user receives a short text message on a mobile phone, the content of which the user can input after he/she has entered his/her regular password. With such an authentication, a false authentication would only be possible on the basis of username, password and the content of the short text message which can only be received when someone has in their possession the mobile phone of the user.

It is an insight of the present inventor that it is a frustrating experience for the user to have to take this code manually from a screen of the mobile phone and to have to input the code without error in for instance his/her computer.

SUMMARY OF THE INVENTION

On the basis of this insight the present inventor has sought to provide an alternative method of authentication on the basis of an alternative communication. The present invention therefore provides a method for authentication between a server process and a client process by means of multiple communication comprising at least a primary authentication communication and a secondary authentication communication, wherein the method comprises steps for:

the server process receiving from the client process an initiating communication of the primary authentication communication, the server process initiating the secondary authentication communication between the server process and a client authentication process, the server process receiving primary authentication information comprising an authentication code or an authentication result by means of the primary authentication communication, the server process receiving secondary authentication information comprising an authentication code or an authentication result of the secondary authentication communication, the server process establishing the authentication on the basis of the primary and secondary authentication information, wherein the primary authentication communication and the secondary authentication communication are separate communications and/or wherein the server process can automatically establish a secondary authentication on the basis of the secondary authentication communication.

An advantage of a method according to the present invention is that, as in the prior art example with the SMS, a separate authentication is possible while the user, as part of the primary authentication information and/or the primary authentication communication, need not enter any data originating from the client authentication process or the secondary authentication communication. The method according to the present invention is hereby simplified to significant extent and realized in more user-friendly manner for the user.

The method according to the present invention can for instance be applied in a situation where a user makes use of a PC to obtain access to a server process, such as a business application, social media account, electronic services account, e-mail account and so on. The user identifies him/herself here in a per se known manner by means of a username and password. Subsequently or simultaneously the server process makes contact with the client authentication process and/or a device of the user which confirms the authentication by means of a feedback call to the server process.

In a first preferred embodiment according to the present invention the secondary authentication communication comprises steps for a user acceptance input to be received by the client authentication process. Such a user acceptance input preferably comprises of actuating a feedback actuator, such as a key or a touchscreen portion configured as a key. It is for instance hereby possible to verify within a predetermined time that the actuation has been performed whereby it is possible to accept that the authentication is correct.

In a further preferred embodiment the client process and the client authentication process can be performed on the same device. The convenience of use is hereby exceptionally high for the user since the user need only handle or have one device available. Alternatively, provision is however made in effective manner by the inventor that the client process and the client authentication process function on two different devices. It is hereby possible for instance by means of a mobile phone to make use of two different computer systems arranged fixed at respective different locations of use.

The client authentication process is more preferably based on a unique device identification of a device on which it is performed, such as for instance an IMEI number. An advantage hereof is that a high degree of certainty as to the identity of the device can be obtained. A further advantage is that the device can be addressed by means of this number for the purpose of delivering the message.

In a further preferred embodiment the client authentication process is performed on a device that has been previously logged in at the server, wherein a previous log in is preferably based on a unique identification of the device for the purpose of performing thereon the client authentication process and/or a user identification which is preferably based on a primary authentication of the user, such as by means of a username and password, and which has more preferably been verified by means of a prior verification with the user. It is hereby possible for instance to keep track of a registration of one on one relations between users of user accounts and devices for the authentication, whereby it becomes possible to limit this authentication within such registrations. A further advantage is that registrations which can be assigned can also be removed, thereby providing the system with an additional security. In addition, it hereby becomes possible for instance to maintain user accounts while the login option can still be stopped in effective manner.

The client authentication process more preferably comprises steps for receiving an input of a security code, such as a pin code or a password, of a user. An additional security is hereby provided for the case the device were to come into the possession of persons other than the user associated with a user account.

In a further preferred embodiment the steps for initiating the secondary authentication communication comprise steps for the server sending a message to the client authentication process, such as a push notification, preferably comprising a token created by the server process. A method for performing the secondary authentication communication is hereby implemented in efficient manner with the already specific advantage that, by applying a push notification, the message can be processed directly by the application performing the client authentication process. This prevents a delay which a user would find annoying and makes the system user-friendly.

For this purpose steps are more preferably applied for the use of a gateway configured to transmit push notifications to the client authentication process. The use of such a gateway provides the advantage that use can be made of standard processes in a mobile device.

The primary and secondary authentication communications more preferably form separate communication loops in the method. This has the advantage that the user does not have to read and retype complicated codes into the client process for processing by the server, as for instance in the case of an existing SMS verification. The convenience of use of a system and method according to the present invention is hereby increased to significant extent. The same applies in the preferred embodiment wherein no information transfer is performed between the primary authentication and the secondary authentication and/or between the secondary authentication and the primary authentication. The convenience of use is increased when such an information transfer is not necessary, for instance as a result of an earlier registration of the device.

Such advantages are likewise gained when the server process has access to a data source comprising previously entered authentication data relating to devices on which the client authentication process is performed. By applying the previous authentications of the devices and/or the client authentication processes the convenience of use can be increased in that the user need not input any data, and the automatic dual factor authentication is hereby provided. It is advantageous in similar manner here when the server process has access to a data source comprising previously entered authentication data relating to preconfigured client authentication processes, such as an app for a client authentication process comprising a storage for authentication data.

The primary authentication more preferably comprises a check by the server process of a username and password received by the server by means of the primary authentication communication between the client process and the server process. The primary authentication is hereby provided in a manner which is per se known to the user and thereby advantageous.

In a further preferred embodiment the method comprises a further authentication by means of a tertiary authentication communication, preferably comprising a check code sent by the server by means of a message and the server receiving the check code back through input by a user by means of the client process. In circumstances deemed insecure an additional protection can hereby be provided which, while it diminishes the convenience of use of the system, does increase security.

A further aspect according to the present invention relates to a method for a client authentication process for applying in a method according to the present invention, comprising steps for:
  receiving from a server process a message such as a push notification, preferably comprising a token created by the server process,
  receiving a confirmation or an authentication, preferably a local authentication, by means of a user input,
  sending to the server process a message signifying a confirmation of the authentication, preferably comprising a confirmation or an authentication code. Advantages are gained by means of such an aspect as described in the foregoing in respect of the previous aspect.

In a further preferred embodiment the method comprises steps for determining by the client authentication process, on the basis of the received message, that the message is intended for the specific client authentication process and/or the device on which it functions.

A further aspect according to the present invention relates to a machine-readable medium comprising instructions for performing a server process or a client authentication process according to the present invention for the purpose of implementing a method according to the present invention. Advantages are gained by means of such an aspect as described in the foregoing in respect of previous aspects of methods.

A further aspect according to the present invention relates to a server configured for or comprising code for performing a method and/or a server process according to the present invention.

A further aspect according to the present invention relates to a device configured for or comprising code for performing a method and/or a client authentication process according to the present invention.

The terms server and server process are used interchangeably and have the same meaning.

BRIEF DESCRIPTION OF THE DRAWINGS

Further advantages, features and details of the present invention will be described in greater detail hereinbelow on the basis of one or more preferred embodiments with reference to the accompanying figures. Similar though not necessarily identical components of different preferred embodiments are designated with the same reference numerals.

DETAILED DESCRIPTION OF THE INVENTION

Figure 1:
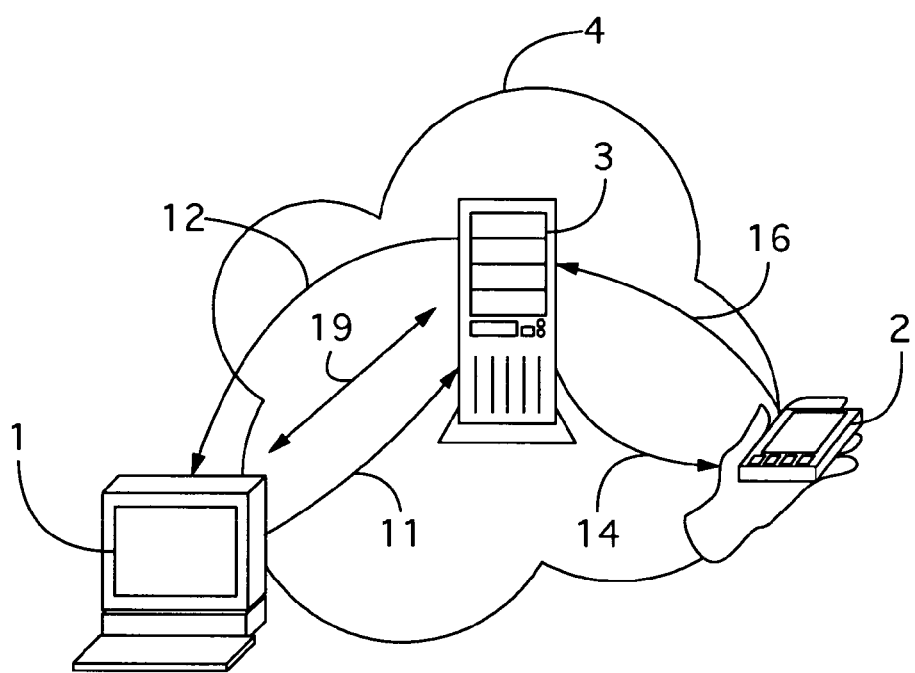
FIG. 1 shows a schematic representation of a system for functioning thereon of a preferred embodiment according to the present invention.

A first preferred embodiment (FIG. 1) according to present invention relates to a method for performing an authentication by means of two separate communication loops. Shown by way of example is a system within which such a method can be performed. A central server 3 functions in order to provide a business application which accounts for different members of staff, e-mail account, user account at one or several optionally combined web services and/or for instance a social media account. If a user wishes to log in to his/her account, he/she starts on a client device 1 a client process which makes contact with server 3 by means of a two-way communication 19 for communication back and forth of application data, such as for instance a web interface. Communication takes place in accordance with the present example in per se known manner via a computer network 4 such as the internet. The server communicates back via a communication 19, preferably comprising a challenge requesting a username and a password which form an authentication code for the first authentication. Once the user has entered the username and the password, these are sent via the communication 11 to the server process in anticipation of a message 12 to be received later and signifying a completion of a secondary authentication.

In the context of the present invention said communications 11 and 12 together form the primary authentication communication. Once the user has entered the username and the password, the primary authentication communication is completed, although the user cannot yet use the client process, and therefore access to the server process, because a secondary authentication has not yet taken place.

Once the primary authentication has been completed by means of the primary authentication communication, the server begins the secondary authentication communication. For this purpose the server process sends a challenge 14 to mobile phone 2 of the user, likewise via the internet and/or via a mobile telephone network. This challenge 14 comprises for instance a push notification for reaching an application which functions on the mobile phone, which application has access to a unique identification of the mobile phone and which is adapted to perform the client authentication process by means of information included in challenge 14 and to send back 16 the result of the processing to the server process for completion of an authentication by the server process.

In order to be able to perform this authentication the server process has access to data relating to device 2, which data have been compiled on the basis of previous authentications of devices 2 as described with reference to FIG. 5.

After the authentication has been completed by the server process, the server process sends a confirmation of the authentications to computer 1 by means of the message 12, after which the user has access to his/her account. With such a method it is not necessary for a user to copy data from the mobile phone for input thereof into computer 1. In other words, the present method provides a dual factor authentication in fully automatic manner. This is possible because the dual factor authentication makes use of a previous authentication of the mobile device or an application functioning thereon.

Use is made for the purpose of the push notification of a gateway for push notifications, such as an Apple™ push notification service. Use can alternatively be made of an e-mail, push notifications or an application which maintains contact with another push service. In further alternative manner use can be made of an activation of an application by the user which, following activation by the user, seeks contract with the server or a further service maintaining contact with the server.

Figure 2:
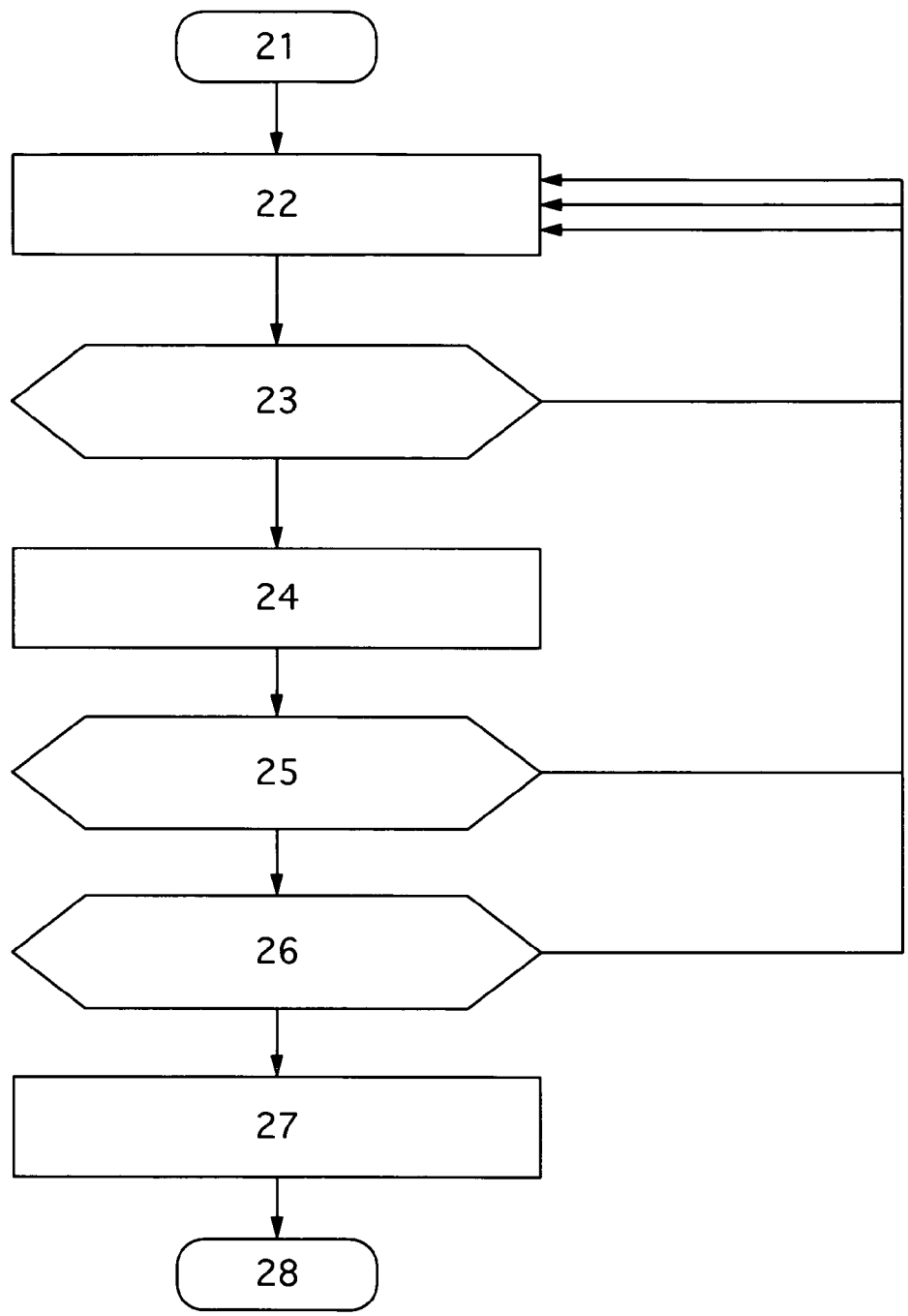
FIG. 2 shows a schematic representation of a method in accordance with a preferred embodiment according to the present invention.

The method of the server process is shown in a preferred embodiment in FIG. 2. The method starts in step 21. In step 22 the input by the user of the username and password is received by the server (compare 11 according to FIG. 1). In step 23 the server checks the username and password, wherein the method returns to step 22 if the data are found to be incorrect. In step 24 the server process sends the push notification to the mobile phone of the user and the server process receives a reply communication from the mobile phone (compare 14, 16 according to FIG. 1).

In step 25 is determined whether the user has given an acceptance, for instance within the valid time duration, by means of activating a button. If this is not the case, the method continues in step 22. In step 26 the received message is parsed by the server process and the information relating to the authentication (token) is verified and the status registered. If authentication is not successful, the method continues in step 22. If the authentication is successful, the method continues in step 27 by sending to the computer of the user a confirmation of correct login (compare 12 according to FIG. 1), after which the method ends in step 28.

Figure 3:
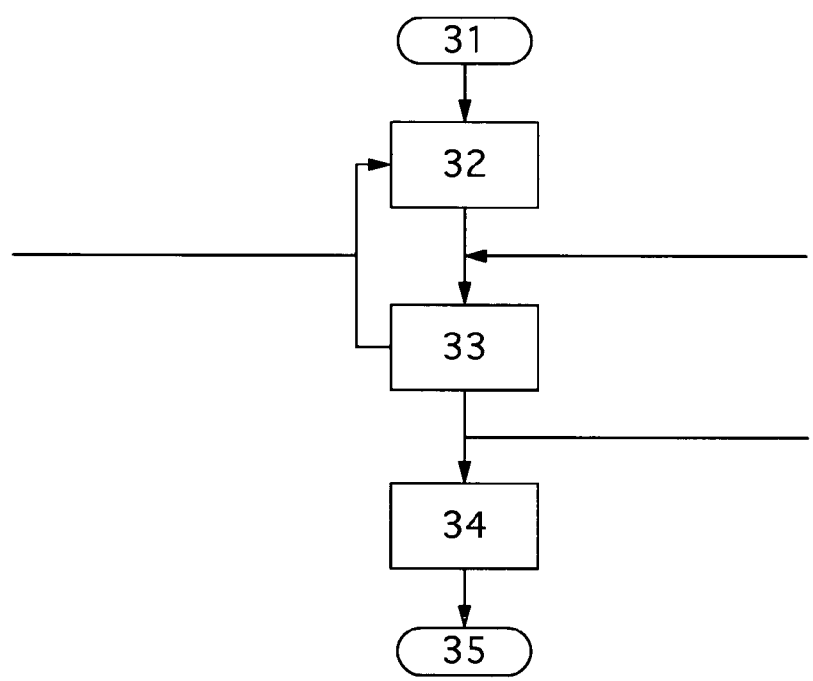
FIG. 3 shows a schematic representation of a method in accordance with a further preferred embodiment according to the present invention.

The process according to communication 19 is shown in FIG. 3. The method begins in step 31. In step 32 the server is ready to receive an initialization of a client process. Between steps 32 and 33 the primary authentication communication is performed, and the server sends the push notification to the phone. In step 33 the server waits for a confirmation from the mobile phone relating to the push notification. Once a set time has elapsed, the server deactivates the token and returns the server to a situation ready to receive an initialization of a client process. The secondary authentication communication is performed between steps 33 and 34. In step 34 the server sends the confirmation relating to a successful login action to computer 1 of the user.

Figure 4:
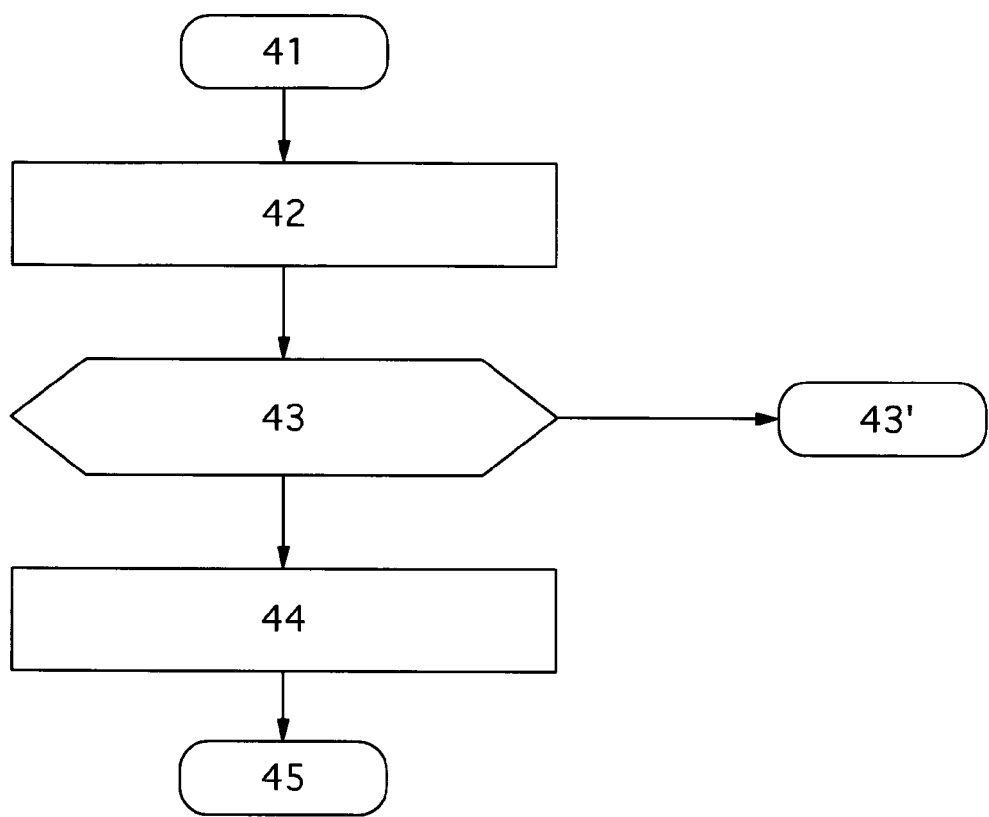
FIG. 4 shows a schematic representation of a method in accordance with a further preferred embodiment according to the present invention.

In FIG. 4 the method is described by way of example on authentication device 2. The method starts in step 41. In step 42 the registered unique device receives the push notification with a token. In step 43 the user is shown a prompt for accepting the token. If the token is not accepted, the method ends in step 43'. If in step 43 the token is accepted, in step 44 the client authentication process sends a message back to the server, the message signifying the acceptance of the token on the registered unique device. Because the acceptance is made on the registered unique device, the authentication is secure.

Figure 5:
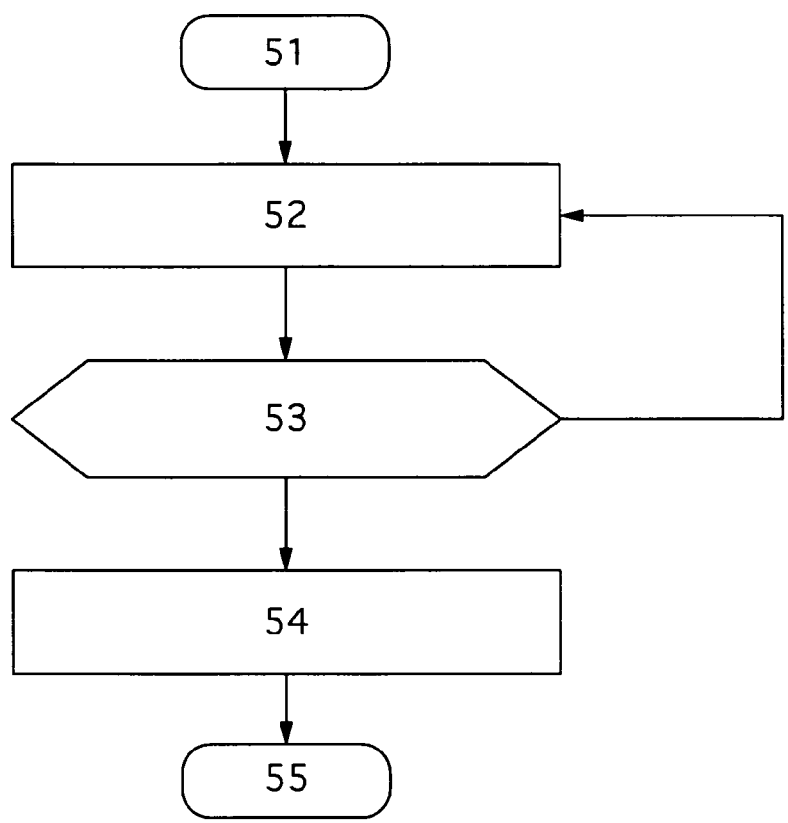
FIG. 5 shows a schematic representation of a method in accordance with a further preferred embodiment according to the present invention.

In FIG. 5 the method for logging in of the unique device at the server or the server process is shown by way of example. The method starts in step 51, after which in step 52 by means of the application comprising the client authentication process the user calls the server process being performed on the server and logs in by means of his/her login information known to the server. This can involve the username and the password with which he/she normally logs into his/her account. This may however also involve a separate combination of username and password. After a check of the login data by the server in step 53, this login authentication is either rejected, after which the method returns to step 52, or the device is registered on the server and linked to a user in step 54. This method ends in step 54.

In alternative manner the link to a user is not made in step 54 but separately following an additional check by an administrator of the server by means of a manual link. It is possible here either that the user can only enter/deliver the login data as according to FIG. 5 to the server in the presence of the administrator, or that the steps for this registration authentication may only be performed by the administrator with use of special authentication codes.

The present invention has been described in the foregoing on the basis of several preferred embodiments. Computer 1 of the user can relate to a plurality of devices such as a personal computer, a tablet, a mobile phone, a thin client and so on. The device for the secondary authentication communication can be any device or process which is performed thereon with which an initial registration or authentication can be performed on the basis of which a later authentication can be deemed as reliable. This authentication can be performed on the basis of a unique identifier of the device, such as an IMEI number of a mobile phone or a processor number of a personal computer or an identification of a special identification chip at an electronic device. It is however also possible for an application to itself comprise authentication means or to be suitable for receiving, processing and sending authentication codes by means of special processing, whereby an application can itself serve as basis for an authentication which can be deemed reliable. It is alternatively possible for instance to allow a content or a part of a content of an SMS message to serve as input for a client authentication process, in other words the client authentication process deems this content to be content of the push notification and the authentication feedback is sent to the server on the basis of this content.

Different aspects of different embodiments are deemed described in combination with each other, wherein all combinations which can be deemed by a skilled person in the field as falling within the scope of the invention on the basis of reading of this document are included. The sequence of method steps according to the present invention is not determined in fixed order, either in the claims or in the specification. Alternatives which can be envisaged by a skilled person on the basis of the invention or the specification likewise fall within the scope of this document. These preferred embodiments are not therefore limitative for the scope of protection of this document. The rights sought are defined in the appended claims.

The invention claimed is:

1. A method for authentication of a login of a client process into a server process on a central server providing a business application by means of multiple communications comprising at least a primary authentication communication and a secondary authentication communication, wherein the method comprises steps for:

the server process receiving on the central server from the client process an initiating communication of the primary authentication communication, the server process of the central server sending an initiating communication to a secondary device, initiating the secondary authentication communication between the server process and a client authentication process, the server process receiving primary authentication information comprising an authentication code or an authentication result by means of the primary authentication communication, the server process receiving from the client authentication process secondary authentication information comprising an authentication code or an authentication result of the secondary authentication communication, the server process establishing the authentication on the basis of the primary authentication information and secondary authentication information, wherein the primary authentication communication and the secondary authentication communication are separate communications and the server process can automatically establish a secondary authentication on the basis of the secondary authentication communication, wherein the server process is arranged to establish the authentication if an actuation is performed within a predetermined time or valid time duration, wherein the client authentication process is performed on the secondary device that has been previously logged in and gained access to the central server by means of a prior verification comprising a step in which a user using an application comprising the client authentication process calls the server process being performed on the server and logs in by means of his/her login information known to the server, and the server process initiating the secondary authentication communication, initiates based on a push notification in the initiating communication to the secondary device that has logged in and gained access to the central server for the secondary authentication process, wherein, by applying the previous login, the user need not transfer any data to the secondary device during the secondary authentication process, and wherein the secondary authentication process provides automatic dual factor authentication with the previously gained verification and content of the push notification used as an input for the client authentication process.

2. The method as claimed in claim 1, wherein the secondary authentication communication comprises steps for a user acceptance input to be received by the client authentication process.

3. The method as claimed in claim 1, wherein the client process and the client authentication process can be performed on the same device.

4. The method as claimed in claim 1, wherein the client process and the client authentication process function on two different devices.

5. The method as claimed in claim 1, wherein the client authentication process is based on a unique device identification of a device on which it is performed.

6. The method as claimed in claim 1, wherein the client authentication process comprises steps for receiving an input of a security code of a user.

7. The method as claimed in claim 1, wherein the steps for initiating the secondary authentication communication comprise steps for the server sending a message to the client authentication process.

8. The method as claimed in claim 7, comprising steps for using a gateway configured to transmit push notifications to the client authentication process.

9. The method as claimed in claim 1, wherein the primary and secondary authentication communications form separate communication loops.

10. The method as claimed in claim 1, wherein no information transfer is performed between the primary authentication and the secondary authentication and/or between the secondary authentication and the primary authentication.

11. The method as claimed in claim 1, wherein the server process has access to a data source comprising previously entered authentication data relating to devices on which the client authentication process is performed.

12. The method as claimed in claim 1, wherein the server process has access to a data source comprising previously entered authentication data relating to preconfigured client authentication processes.

13. The method as claimed in claim 1, wherein the primary authentication comprises a check by the server process of a username and password received by the server by means of the primary authentication communication between the client process and the server process.

14. The method as claimed in claim 1, comprising a further authentication by means of a tertiary authentication communication.

15. The method for a client authentication process for applying in a method as claimed in claim 1, comprising steps for:
receiving from a server process the message,
receiving a confirmation or an authentication by means of a user input,
sending to the server process the message signifying a confirmation of the authentication.

16. The method as claimed in claim 15, comprising steps for determining by the client authentication process, on the basis of the received message, that the message is intended for the specific client authentication process and/or the device on which it functions.

17. The method according to claim 1, comprising steps for removing a previously logged in device.

18. The method according to claim 1, comprising steps to keep track of one on one relations between users of user accounts and devices for the authentication.

19. A non-transitory computer-readable medium for authentication of a login of a client process into a server process on a central server providing a business application using multiple communications with at least a primary authentication communication and a secondary authentication communication, comprising programming instructions stored thereon, that when executed on a processor, perform the steps of:
the server process on the central server receiving from the client process an initiating communication of the primary authentication communication,
the server process on the central server sending an initiating communication to a secondary device initiating the secondary authentication communication between the server process and a client authentication process,
the server process receiving primary authentication information comprising an authentication code or an authentication result by means of the primary authentication communication,
the server process receiving from the client authentication process secondary authentication information comprising an authentication code or an authentication result of the secondary authentication communication,
the server process establishing the authentication on the basis of the primary authentication information and secondary authentication information,
wherein the primary authentication communication and the secondary authentication communication are separate communications and the server process can automatically establish a secondary authentication on the basis of the secondary authentication communication,
wherein the server process is arranged to establish the authentication if an actuation is performed within a predetermined time or valid time duration,
wherein the client authentication process is performed on a secondary device that has been previously logged in and gained access to the central server by means of a prior verification comprising a step in which a user using an application comprising the client authentication process calls the server process being performed on the server and logs in by means of his/her login information known to the server, and
wherein the server process initiating the secondary authentication communication, initiates based on a push notification in the initiating communication to the secondary device that has logged in and gained access to the central server for the secondary authentication process, wherein, by applying the previous login, the user need not transfer any data to the secondary device during the secondary authentication process, and wherein the secondary authentication process provides automatic dual factor authentication with the previously gained verification and content of the push notification used as an input for the client authentication process.

20. A system for authentication of a login of a client process into a server process on a central server providing a business application using multiple communications with at least a primary authentication communication and a secondary authentication communication, the system comprising:
the central server, comprising one or more processors and memory for programming instructions stored thereon and processed by the one or more processors, wherein the central server is programmed to provide:
the server process for receiving from the client process an initiating communication of the primary authentication communication,
the server process sending an initiating communication to a secondary device initiating the secondary authentication communication between the server process and a client authentication process,
the server process receiving primary authentication information comprising an authentication code or an authentication result by means of the primary authentication communication,
the server process receiving from the client authentication process secondary authentication information comprising an authentication code or an authentication result of the secondary authentication communication,
the server process establishing the authentication on the basis of the primary authentication information and secondary authentication information, wherein the primary authentication communication and the secondary authentication communication are separate communications and the server process can automatically establish a secondary authentication on the basis of the secondary authentication communication, wherein the server process is arranged to establish the authentication if an actuation is performed within a predetermined time or valid time duration, wherein the client authentication process is performed on the secondary device that has been previously logged in and gained access to the server by means of a prior verification comprising a step in which a user using an application comprising the client authentication process calls the server process being performed on the server and logs in by means of his/her login information known to the server, and wherein the server process initiating the secondary authentication communication, initiates based on a push notification in the initiating communication to the secondary device that has logged in and gained access to the central server for the secondary authentication process, wherein, by applying the previous login, the user need not transfer any data to the secondary device during the secondary authentication process, and wherein the secondary authentication process provides automatic dual factor authentication with the previously gained verification and content of the push notification used as an input for the client authentication process.

* * * * *